(12) United States Patent
Bharadwaj et al.

(10) Patent No.: US 9,568,321 B2
(45) Date of Patent: Feb. 14, 2017

(54) SYSTEMS AND METHODS FOR DETERMINING INERTIAL NAVIGATION SYSTEM FAULTS

(75) Inventors: Raj Mohan Bharadwaj, Maple Grove, MN (US); Vibhor L. Bageshwar, Minneapolis, MN (US); Kyusung Kim, Plymouth, MN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 880 days.

(21) Appl. No.: 13/029,204

(22) Filed: Feb. 17, 2011

(65) Prior Publication Data

US 2011/0257927 A1 Oct. 20, 2011

Related U.S. Application Data

(60) Provisional application No. 61/325,697, filed on Apr. 19, 2010.

(51) Int. Cl.
*G01C 9/00* (2006.01)
*G06F 11/30* (2006.01)
(Continued)

(52) U.S. Cl.
CPC ........... *G01C 21/165* (2013.01); *G01C 25/005* (2013.01)

(58) Field of Classification Search
CPC ........ G01C 21/165; G01C 21/16; G01C 21/20
(Continued)

(56) References Cited

U.S. PATENT DOCUMENTS 5,451,964 A * 9/1995 Babu ..................... 342/357.31
5,719,764 A 2/1998 McClary
(Continued)

FOREIGN PATENT DOCUMENTS

DE 102005018078 A1 10/2006
DE 102007012373 A1 9/2007
(Continued)

OTHER PUBLICATIONS

EP Search Report for EP 09167212.1 dated Oct. 16, 2009.
(Continued)

*Primary Examiner* — Gregory J Toatley
*Assistant Examiner* — Eman Alkafawi
(74) *Attorney, Agent, or Firm* — Ingrassia Fisher & Lorenz, P.C.

(57) ABSTRACT

An inertial navigation system (INS) includes a primary inertial navigation system (INS) unit configured to receive accelerometer measurements from an accelerometer and angular velocity measurements from a gyroscope. The primary INS unit is further configured to receive global navigation satellite system (GNSS) signals from a GNSS sensor and to determine a first set of kinematic state vectors based on the accelerometer measurements, the angular velocity measurements, and the GNSS signals. The INS further includes a secondary INS unit configured to receive the accelerometer measurements and the angular velocity measurements and to determine a second set of kinematic state vectors of the vehicle based on the accelerometer measurements and the angular velocity measurements. A health management system is configured to compare the first set of kinematic state vectors and the second set of kinematic state vectors to determine faults associated with the accelerometer or the gyroscope based on the comparison.

20 Claims, 3 Drawing Sheets

(51) Int. Cl.
*G01C 21/16* (2006.01)
*G01C 25/00* (2006.01)

(58) Field of Classification Search
USPC .................................................. 702/150, 183
See application file for complete search history.

(56) References Cited

U.S. PATENT DOCUMENTS

| | | | |
|---|---|---|---|
| 5,906,655 A | 5/1999 | Fan | |
| 5,969,668 A | 10/1999 | Young, Jr. | |
| 6,018,698 A | 1/2000 | Nicosia et al. | |
| 6,167,347 A | 12/2000 | Lin | |
| 6,240,367 B1 | 5/2001 | Lin | |
| 6,266,582 B1 | 7/2001 | Bruckner | |
| 6,298,316 B1 | 10/2001 | Diesel | |
| 6,408,245 B1 * | 6/2002 | An et al. ........................ | 701/472 |
| 6,430,488 B1 | 8/2002 | Goldman et al. | |
| 6,449,559 B2 | 9/2002 | Lin | |
| 6,611,842 B1 | 8/2003 | Brown | |
| 6,654,685 B2 | 11/2003 | McIntyre | |
| 6,665,600 B2 | 12/2003 | Miller et al. | |
| 6,759,943 B2 | 7/2004 | Lucy et al. | |
| 6,957,207 B2 | 10/2005 | Sasaki | |
| 6,982,669 B2 | 1/2006 | Coatantiec et al. | |
| 7,177,738 B2 | 2/2007 | Diaz | |
| 7,203,486 B2 | 4/2007 | Patel | |
| 7,219,013 B1 | 5/2007 | Young et al. | |
| 7,283,902 B2 | 10/2007 | Heider et al. | |
| 7,328,104 B2 | 2/2008 | Overstreet et al. | |
| 7,409,289 B2 | 8/2008 | Coatantiec et al. | |
| 7,447,590 B2 | 11/2008 | Arethens | |
| 8,065,074 B1 * | 11/2011 | Liccardo ........................ | 701/480 |
| 8,290,744 B2 * | 10/2012 | Brady et al. .................. | 702/183 |
| 2001/0020216 A1 | 9/2001 | Lin | |
| 2002/0019701 A1 | 2/2002 | Miller | |
| 2002/0073088 A1 | 6/2002 | Beckmann et al. | |
| 2003/0023463 A1 | 1/2003 | Dombroski et al. | |
| 2003/0080850 A1 | 5/2003 | Kline | |
| 2003/0135327 A1 * | 7/2003 | Levine et al. ............... | 701/220 |
| 2003/0149600 A1 | 8/2003 | Williams | |
| 2004/0010358 A1 | 1/2004 | Oesterling et al. | |
| 2004/0268217 A1 | 12/2004 | Hughes et al. | |
| 2005/0125141 A1 | 6/2005 | Bye | |
| 2005/0144048 A1 | 6/2005 | Belanger et al. | |
| 2005/0261815 A1 | 11/2005 | Cowelchuk et al. | |
| 2006/0038447 A1 | 2/2006 | Bruelle-Drews | |
| 2006/0123081 A1 | 6/2006 | Baudino et al. | |
| 2007/0219675 A1 | 9/2007 | Uchida et al. | |
| 2007/0239494 A1 | 10/2007 | Stephens et al. | |
| 2007/0294116 A1 | 12/2007 | Stephens et al. | |
| 2008/0151793 A1 | 6/2008 | Wright | |
| 2008/0151841 A1 | 6/2008 | Yi et al. | |
| 2008/0151889 A1 | 6/2008 | Yi et al. | |
| 2009/0157461 A1 | 6/2009 | Wright et al. | |
| 2009/0192728 A1 | 7/2009 | Wright et al. | |
| 2009/0216935 A1 | 8/2009 | Flick | |
| 2009/0254278 A1 | 10/2009 | Wang | |
| 2009/0326816 A1 | 12/2009 | Park et al. | |
| 2010/0228408 A1 * | 9/2010 | Ford ..................... | G01C 21/165 |
| | | | 701/16 |
| 2011/0117903 A1 * | 5/2011 | Bradley ........................ | 455/418 |
| 2011/0304507 A1 * | 12/2011 | Mujahed et al. ............. | 342/417 |

FOREIGN PATENT DOCUMENTS

| | | |
|---|---|---|
| EP | 1837627 A2 | 9/2007 |
| EP | 1837627 A3 | 11/2007 |
| JP | 62128850 A | 6/1987 |
| JP | 2005246997 A | 9/2005 |
| WO | 2004074047 A1 | 9/2004 |
| WO | 2005069131 A1 | 7/2005 |

OTHER PUBLICATIONS

EP Office Action for EP 09167212.1 dated Nov. 6, 2009.
EP Office Action for EP 09167212.1-1264 dated Apr. 20, 2011.
EP Office Action for EP 09167212.1-1264 dated Nov. 30, 2012.
USPTO Office Action for U.S. Appl. No. 12/186,885 dated Jul. 27, 2011.
USPTO Final Office Action for U.S. Appl. No. 12/186,885 dated Jan. 5, 2012.
Boys, R. Diagnostics and Prognostics for Military and Heavy Vehicles, 2004, pp. 1-13, Version 1.81, Dearborn Group, Inc.
USPTO Office Action for U.S. Appl. No. 12/186,885; Notification date Jan. 5, 2012.
JP Office Action for Application No. JP 2009-182723 dated Sep. 10, 2013.
JP Office Action for Application No. JP 2009-182723 dated Jan. 8, 2014.
EP search report, EP 11155074.5-1557/2378248, dated Mar. 24, 2014.
CN Office Action for Application No. 201110050581.6 dated Jan. 12, 2015.
EP Communication for Application No. 11155074.5-1557, dated Aug. 21, 2015.
CN Office Action for Application No. 201110050581.6 dated Sep. 15, 2015.
USPTO Notice of Allowance for U.S. Appl. No. 12/186,885 dated Dec. 3, 2015.

* cited by examiner

SYSTEMS AND METHODS FOR DETERMINING INERTIAL NAVIGATION SYSTEM FAULTS

CROSS-REFERENCE TO RELATED APPLICATION

This application claims the benefit of U.S. Provisional Application No. 61/325,697, filed Apr. 19, 2010, the disclosure of which is hereby incorporated by reference.

STATEMENT REGARDING FEDERALLY SPONSORED RESEARCH OR DEVELOPMENT

This invention was made with Government support under Contract No. NNA08BA45C awarded by NASA. The Government has certain rights in this invention

TECHNICAL FIELD

The present invention generally relates to inertial navigation systems, and more particularly relates to health management systems and the detection of gyroscope and accelerometer faults in inertial navigation systems.

BACKGROUND

An inertial navigation system (INS) is a navigation aid that uses one or more inertial measurement units (IMUs) with sensors such as accelerometers and gyroscopes to continuously calculate position, velocity, and angular orientation of a moving object. An INS may be used on vehicles such as land vehicles, ships, aircraft, submarines, guided missiles, and spacecraft. The fidelity of the sensor measurements from the IMU is important to the overall navigation performance, and sensor faults or inaccurate sensor measurement models may cause a loss in navigation performance. Aiding sensors, such as global navigation satellite system (GNSS) sensors, have been used to correct navigation errors due to accelerometer bias and gyroscope bias, but the conventional approaches may not be satisfactory to correct navigation errors, particularly with respect to issues such as accelerometer and gyroscope measurement faults or accelerometer and gyroscope measurement model errors.

Accordingly, it is desirable to provide more accurate and robust INSs in the presence of IMU sensor measurement faults and IMU measurement model errors. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an inertial navigation system (INS) includes a primary inertial navigation system (INS) unit configured to receive accelerometer measurements from an accelerometer and angular velocity measurements from a gyroscope. The primary INS unit is further configured to receive global navigation satellite system (GNSS) signals from a GNSS sensor and to determine a first set of kinematic state vectors based on the accelerometer measurements, the angular velocity measurements, and the GNSS signals. The INS further includes a secondary INS unit configured to receive the accelerometer measurements and the angular velocity measurements and to determine a second set of kinematic state vectors of the vehicle based on the accelerometer measurements and the angular velocity measurements. The INS further includes a health management system configured to compare the first set of kinematic state vectors and the second set of kinematic state vectors to determine faults associated with at least one of the accelerometer or the gyroscope based on the comparison.

In accordance with another exemplary embodiment, a vehicle system includes an inertial measurement unit (IMU) comprising an accelerometer configured to generate acceleration measurements and a gyroscope configured to generate angular velocity measurements; a global navigation satellite system (GNSS) configured to generate GNSS signals; a primary inertial navigation system (INS) unit configured to receive the accelerometer measurements, the angular velocity measurements, and the GNSS signals, the primary INS unit further configured to determine a first set of kinematic state vectors based on the accelerometer measurements, the angular velocity measurements, and the GNSS signals; a secondary INS unit configured to receive the accelerometer measurements and the angular velocity measurements and to determine a second set of kinematic state vectors of the vehicle based on the accelerometer measurements and the angular velocity measurements; and a health management system coupled to the primary INS unit and the secondary INS unit and configured to compare the first set of kinematic state vectors and the second set of kinematic state vectors to determine faults associated with at least one of the accelerometer or the gyroscope based on the comparison.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments described herein are directed to a vehicle system with an inertial navigation system (INS) that includes a primary INS unit that calculates a first set of kinematic state vectors of the vehicle based on signals from an inertial measurement unit (IMU), a global navigation satellite system (GNSS), and other aiding sensors. The INS may further include a secondary INS unit that calculates a second set of kinematic state vectors of the vehicle without considering the signals from the GNSS. A health management system identifies faults associated with the IMU based on a comparison between the kinematic state vectors from the primary INS unit and the second INS unit, as well as other vehicle information, as will now be described in greater detail with reference to FIGS. 1-4.

Figure 1:
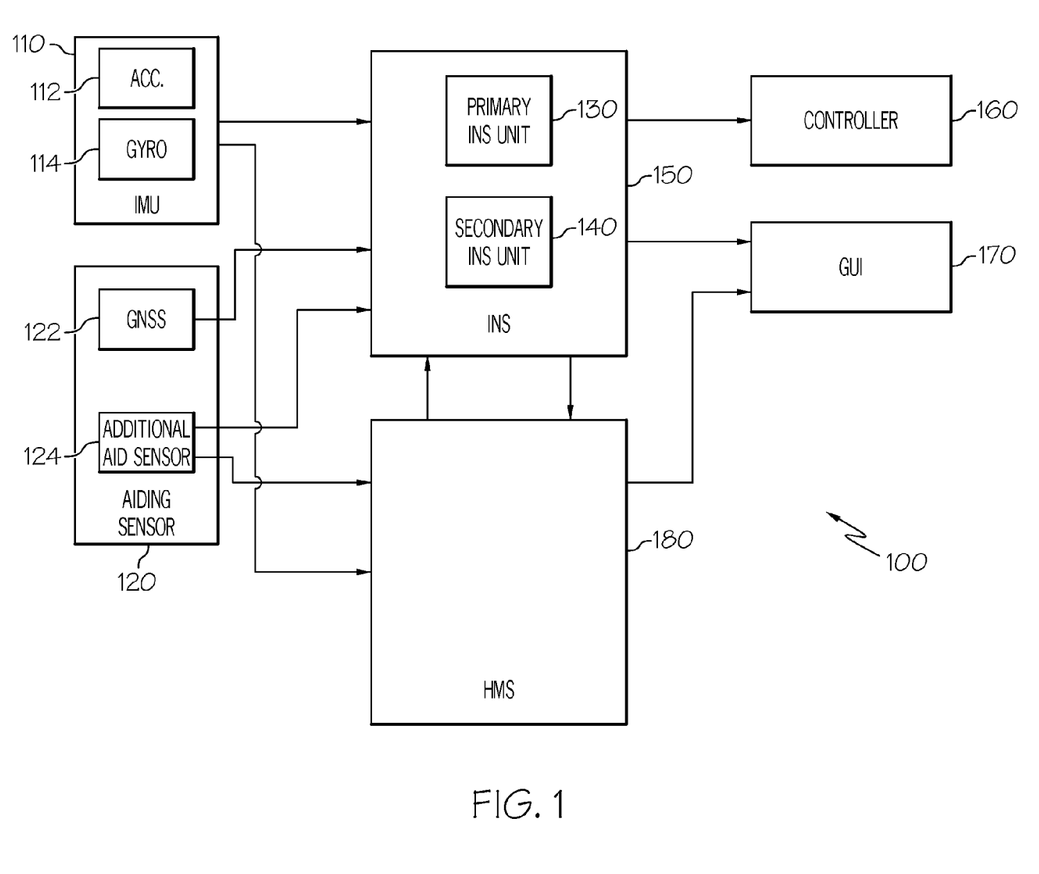
FIG. 1 is a functional block diagram of a vehicle system having an inertial navigation system (INS) in accordance with an exemplary embodiment.

FIG. 1 is a functional block diagram of a vehicle system 100 in accordance with an exemplary embodiment. As shown, the vehicle system 100 may include an inertial measurement unit (IMU) 110, aiding sensors 120, an inertial navigation system (INS) 150, a health management system 180, a controller 160, and a graphical user interface (GUI) or display 170.

The vehicle system 100, and particularly the INS 150, may be used for navigation and control in any suitable type of vehicle (not shown), including land vehicles, aircraft, submarines, guided missiles and spacecraft. In general, and as discussed in greater detail below, the INS 100 includes a primary INS unit 130 and a secondary INS unit 140 that determine the position, velocity, and angular orientation of the associated vehicle based on signals from an inertial measurement unit (IMU) 110. As discussed below, the position, velocity, and angular orientation of the vehicle may also be based on signals from the group of aiding sensors 120, which may include a global navigation satellite system (GNSS) 122, such as a global positioning system (GPS), as well as additional aiding sensors 124.

As used herein, the position, velocity, and angular orientation of the vehicle may collectively be referred to as kinematic state vectors. The INS 150 provides the kinematic state vectors to the controller 160, which includes any of the functionalities necessary (for example, controlling flaps, engines, thrusters, rockets, and the like) for guidance, control, and stabilization of the vehicle along a desired trajectory. The kinematic state vectors from the INS 150 may also be appropriately formatted and displayed on the GUI 170 for viewing by an operator. As also discussed below, the calculation of the kinematic state vectors may be subject to errors associated with the measurements of the IMU 110. Although the primary INS unit 130 may incorporate some error correction, the health management system 180 is provided to more accurately detect and accommodate errors and faults associated with the IMU 110. The health management system 180 may be the central health management system of the vehicle or dedicated to the INS 150.

In general and as described in greater detail below, the primary INS unit 130 generates the kinematic state vectors based on signals from the IMU 110 and aiding sensors 120, including the GNSS 122, that are subsequently provided to the controller 160. The secondary INS unit 140 functions similarly to the primary INS unit 130 to generate an additional set of kinematic state vectors based on signals from the IMU 110 and, at times, on some of the additional aiding sensors 124. As used herein, the "first set" of kinematic state vectors refers to the kinematic state vectors generated by the primary INS unit 130 and the "second set" of kinematic state vectors refers to the kinematic state vectors generated by the secondary INS unit 140. Unlike the first set of kinematic state vectors, the second set of kinematic state vectors is generated without any consideration of the signals from the GNSS 122. The second set of kinematic state vectors is provided to the health management system 180 for improved error and fault detection, as discussed below. Although the second INS unit 140 is illustrated as part of the INS 150, the secondary INS unit 140 may be considered separate from the INS 150 or part of the health management system 180.

Now turning to the diagram in FIG. 1 in greater detail, the IMU 110 includes sensors such as accelerometers 112 and rate gyroscopes 114. In one exemplary embodiment, the IMU 110 may be considered part of the INS 150. The IMU 110 typically contains three orthogonal accelerometers 112 and three orthogonal gyroscopes 114, although various types may be provided. The accelerometers 112 and gyroscopes 114, respectfully, provide measurements associated with the acceleration and angular velocity of the vehicle to the INS 150. The INS 150 determines the kinematic state vector of the vehicle in two reference frames based on the measurements provided by the IMU 110. The two reference frames typically include a fixed body vehicle frame and a navigation frame with known orientation.

Initially, the primary INS unit 130 integrates angular velocity measurements from the gyroscopes-114 to compute the orientation of the vehicle body frame relative to the navigation frame. In one exemplary embodiment, the accelerometers 112 measure specific force, which is then subject to gravity and accelerometer bias compensation by the primary INS unit 130 to yield vehicle acceleration. The primary INS unit 130 further resolves the compensated acceleration in the navigation frame and integrates the compensated vehicle acceleration to result in a velocity vector resolved in the navigation frame. Integrating the compensated vehicle acceleration twice results in a position vector resolved in the navigation frame. Of course, other mechanisms for calculating the position, velocity, and angular orientation of the vehicle may be provided.

However, as introduced above, the IMU measurements may have associated errors, such as bias, scale factor, non-orthogonality, and wide band noise. If uncorrected, these errors may result in potentially unbounded errors in the estimates of the kinematic state vectors. For example, a constant error in the acceleration measurement will become a linear velocity error as the primary INS unit 130 integrates the acceleration measurement to determine velocity. Continuing the example, a constant error in the acceleration measurement will become a parabolic position error as the primary INS unit 130 twice integrates the acceleration measurement to determine position. Similarly, a constant error in the angular velocity will become a linear angular orientation error as the primary INS unit 130 integrates the angular velocity to determine angular orientation. The error in the angular velocity further affects the velocity and position calculations since the angular orientation is used to resolve the velocity and position in the navigation frame. Non-linear or random errors further exacerbate this issue. As such, the primary INS unit 130 attempts to correct errors when determining the kinematic state vector. In some exemplary embodiments, it is generally preferred that the errors are removed prior to integrating the measurements, since there is some randomness and estimation involved in the error itself.

There are several types of faults that may result in errors in the kinematic state vectors. Such errors may include, for example, IMU sensor measurement faults at a particular time (for example, the measurement should have been 1 $m/s^2$ but the measurement was 100 $m/s^2$); or mismatches between the IMU measurements and the IMU sensor measurement model (for example, due to parameter errors in the model occurring over time or modeling error such as missing a parameter or using an incorrect parameter). These faults may be an indication of bias, which may include bias change or bias drift and refer to an error in the model or the sensor itself. In one exemplary embodiment, the bias change may be a relatively slow time-varying error or the bias change may be a relatively fast time-varying error, although any suitable characterization techniques may be provided. In general, bias change is the most common fault of interest with respect to the accelerometers 112 of the IMU 110, and bias drift is the most common fault with respect to the gyroscopes 114 of the IMU 110.

As one approach to correct or accommodate these errors, the primary INS unit 130 further receives aiding sensor measurements that include GNSS measurements from the GNSS 122 and additional aiding sensor measurements from the additional aiding sensors 124, as noted above. In general, the GNSS 122 may include a receiver that receives satellite signals to determine position and velocity, for example. The additional aiding sensors 124 may include, for example, various combinations of a magnetometer, a barometer, an odometer, or any other sensor. The measurements from the additional aiding sensors 124 and GNSS 122 are independent of the IMU sensor measurements and can be used to periodically estimate the kinematic state vector errors and reset the IMU-based estimates of the kinematic state vectors to thus produce improved estimates of the kinematic state vectors. For example, the GNSS 122 may provide position and velocity measurements that may be compared to the position and velocity values initially estimated by the primary INS unit 130 based on the measurements from the IMU 110. This comparison provides a basis for estimating the errors in the position and velocity values generated by the primary INS 130. The corresponding correction of these estimates prevents any errors from the IMU-based estimates from growing without bound. As another example, a magnetometer of the additional aiding sensors 124 may be used to compute heading angle either in combination with the heading angle computed from GNSS velocity measurements or by itself. Despite these signals from the aiding sensors 120, some errors may remain, as discussed below.

In accordance with exemplary embodiments, the vehicle system 100 further considers the errors remaining in the kinematic state vectors generated by the primary INS unit 130 to generally provide more accurate kinematic state calculations. Although the GNSS 122 may be used to remove some errors from the kinematic state vector calculations in the primary INS unit 130 by providing position and velocity measurements, the GNSS 122, in some embodiments, operates at a much lower frequency than the IMU 110, and the primary INS unit 130 generally must generate kinematic state vectors more often than it receives information from the GNSS 122. As such, if the GNSS 122 is the sole source of error correction, some errors in the kinematic state vectors will remain, particularly errors such as accelerometer bias change resulting from faults in the accelerometer 112 and gyroscope bias drift resulting from faults in the gyroscopes 114.

To accommodate and detect these errors, the health management system 180 may be initialized to receive and process the first set of kinetic state vectors generated by the primary INS unit 130 and the second set of kinematic state vectors generated by the secondary INS unit 140. As stated above, the secondary INS unit 140 generates position, velocity, and angular orientation in a manner similar to the primary INS unit 130, except that the measurements from the GNSS 122 are not considered. For example, the secondary INS unit 140 may use dynamic models, IMU sensor measurement models, aiding sensor measurement models, and filters, like the primary INS unit 130, but does not modify, correct, or calibrate the resulting kinematic state vectors based on the measurements from the GNSS 122. As a result, the uncompensated IMU sensor measurement errors are integrated with the IMU sensor measurements when the secondary INS unit 140 calculates the kinematic state vectors, thereby enabling the errors in the estimated kinematic state vectors to grow without bound. Measurements from the additional aiding sensors 124 may or may not be used to calculate the kinematic state vectors of the secondary INS unit 140. In effect, the secondary INS unit 140 enables such errors to grow as necessary or desired, without correction from the GNSS 122, such that any errors associated with the IMU 110 may be more easily identified.

Accordingly, the health management system 180 then identifies faults within the IMU 110 by comparing two sets of kinetic state vectors respectively generated by the primary INS unit 130 and the secondary INS unit 140. The resulting difference corresponds to errors attributed to measurement errors or bias in the IMU 110. The faults may be stored for later use or displayed to an operator on the GUI 170. Further details of the primary INS unit 130, secondary INS unit 140, and health management system 180 will now be described with reference to FIG. 2.

Figure 2:
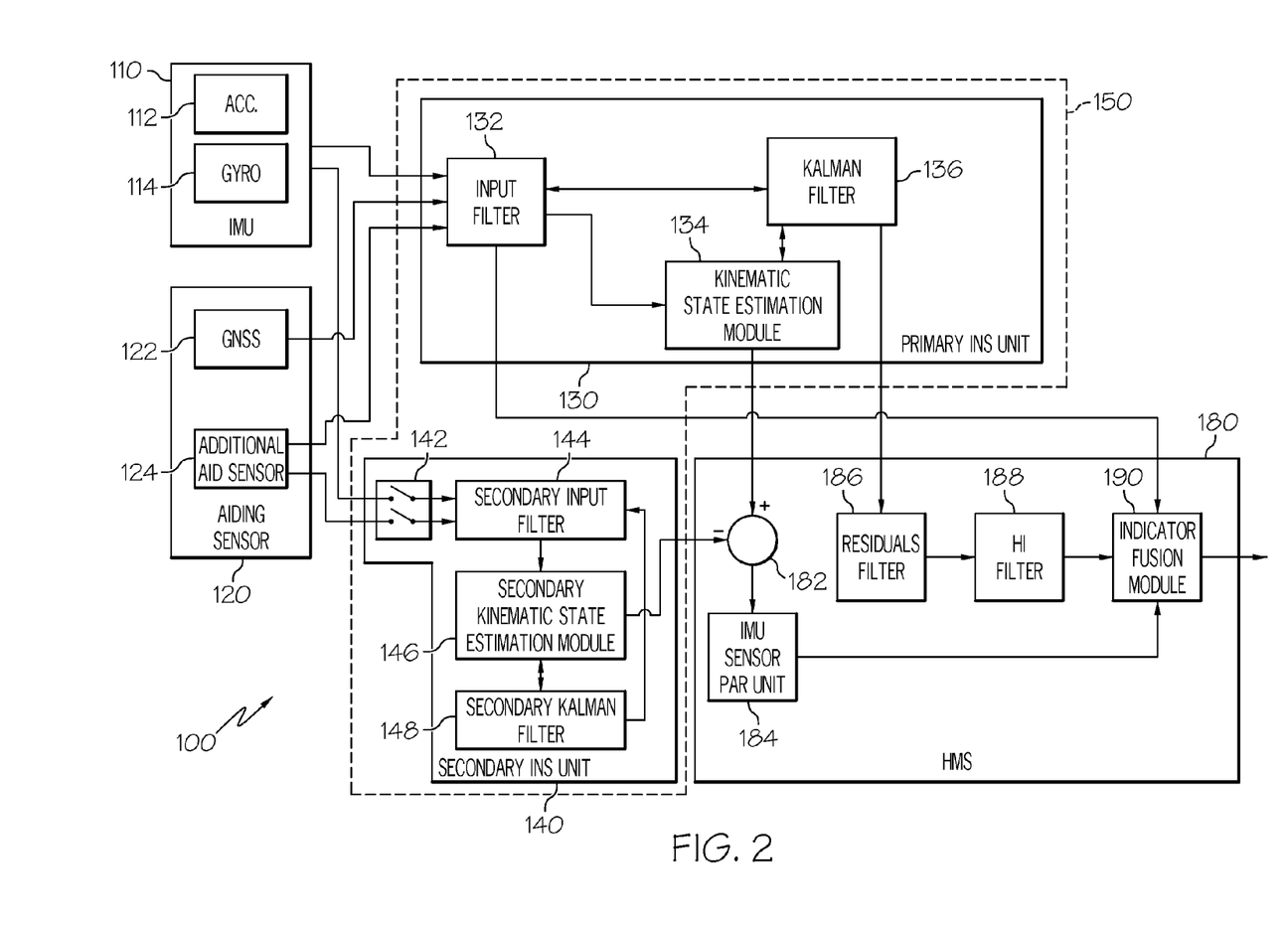
FIG. 2 is a more detailed functional block diagram of portions of the vehicle system of FIG. 1 in accordance with an exemplary embodiment.

FIG. 2 is a more detailed functional block diagram of portions of the vehicle system 100 of FIG. 1 in accordance with an exemplary embodiment. FIG. 2 generally corresponds to the vehicle system 100 discussed above, and particularly illustrates the error correction mechanisms of the primary INS unit 130, the secondary INS unit 140, and the health management system 180 in greater detail.

As shown in FIG. 2, the primary INS unit 130 includes an input filter 132, a kinematic state vector estimation module 134, and a Kalman filter 136. In this exemplary embodiment, measurements from the IMU 110, which includes the accelerometers 112 and the gyroscopes 114, the GNSS unit 122, and the additional aiding sensors 124 are provided to the input filter 132 of the primary INS unit 130. The input filter 132 generally functions to reject measurements that are completely outside of a possible range. For example, the input filter 132 may calculate the input residuals, e.g., the difference between the sensor measurements and the current estimate of the kinematic state vector, and use statistical tests to determine which measurements should be rejected. These rejected measurements from the input filter 132 may be provided to the health management system 180 as first health indicators.

The accepted measurements from the input filter 132 are provided to the kinematic state vector estimation module 134, which includes a number of models that initially estimate the kinematic state vectors based on the measurements from the IMU 110. The models may include dynamic models, measurement models, and sensor measurements models for generating a stochastic system that uses the sensor measurements to compute estimates of the kinematic state vectors. As described above, the kinematic state vector estimation module 134 is particularly configured to evaluate the measurements from the IMU 110 and to produce acceleration values, which are then integrated a first time to produce velocity values and a second time to produce position values, each of which are may be resolved in the desired reference frame.

The kinematic state vector estimation module 134 provides the initial kinematic state vectors to the Kalman filter 136, which in turn, blends the kinematic state vectors with the aiding sensor measurements to produce bounded estimates of posterior (or compensated) kinematic state vectors. In general, the Kalman filter 136 uses measurements from the GNSS 122 and additional aiding sensors 124, which are independent of the IMU 110, to correct the measurements from the IMU 110 to provide more accurate kinematic state vectors. The Kalman filter 136 may include a bias estimation module and an a-priori bias estimation module. The bias estimation module may include a number of models that estimate the measurement bias of the IMU 110 with, for example, measurements from the aiding sensors 120 (e.g., the GNSS 122 and the additional aiding sensors 124), and may use some a-priori bias statistics from the a-priori bias estimation module, for example, to account for known biases. In one exemplary embodiment, the a-priori bias estimation model is a dynamic model of the bias and uses the IMU measurements to propagate the statistics of the IMU bias forward to provide a-priori bias statistics, and the bias estimation module uses combinations of the aiding sensor measurements, a-priori kinematic state vector, and a-priori bias statistics to update the a-priori bias statistics as posterior bias statistics.

The aiding sensor measurements may be used to correct the effect of the forward integration of any IMU measurement biases, as discussed above. In general, the kinematic state vectors are predicted using the dynamic models, the IMU sensor measurements, and IMU measurement models; and the aiding sensor measurements are used in aiding sensor measurement models to correct the IMU based estimates of position, velocity, and angular orientation. As an example, information generated by the dynamic models of the kinematic state vector estimation module 134 and/or Kalman filter 136 may include the time evolution of the kinematic state vectors, the kinematic state error vectors, and the covariance matrix of the kinematic state vectors. Sensor measurements models of the kinematic state vector estimation module 134 and/or Kalman filter 136 may indicate the time evolution of the sensor measurement errors or the relationship between sensor measurements, sensor measurement errors, kinematic state vectors, and kinematic state error vectors. The IMU sensor measurement models may further include parameters that model the performance characteristics of the sensors including sensor measurement errors or biases. The estimates of the parameters of these sensor models may attempt to compensate for a number of factors such as model matching errors, calibration errors, temperature variation, vehicle vibration, etc. In general, the Kalman filter 136 uses the models and all sensor measurements in an iterative prediction correction approach.

In one exemplary embodiment, the Kalman filter 136 produces the posterior primary kinematic state vectors and estimated errors as follows. As noted above, the bias estimation module may provide at least some error estimates, including residuals between observed values and estimated values. From the residuals and associated statistical properties, a scalar test statistic with chi-square distribution and n degrees of freedom is created, where n is the number of measurements used for creating the test statistic. This statistic is later compared with a predefined threshold to identify errors. Using the chi-square distribution allows a group of measurements to be correlated to each other, thereby improving the chances to successfully detect and calculate an error and the corresponding bias for accelerometer and gyroscope measurements. A Gauss-Markov (GM) process may be used to model a time varying bias ($\dot{b}_{GM}(t)$), for example:

$$\tilde{y} = y + \delta y + w$$

$$\delta y = b_{const} + b_{GM}$$

$$\dot{b}_{GM}(t) = \frac{-1}{\tau} b_{GM}(t) + w_{GM}$$

where y is the accelerometer or gyroscope measurement; $\delta y$ is the accelerometer or gyroscope bias; w is a zero mean, Gaussian white noise process; $w_{GM}$ is zero mean, Gaussian white noises that drive the GM process; and $\tau$ is the time constant of the GM process.

The accelerometer bias model may be simplified by estimating the constant bias at initialization. Then, the time-varying bias and the white noise components correspond to the remaining error sources of the IMU 110. Upon calculation of the errors and associated corrections, the first set of kinematic state vectors may be provided to the controller 160 (FIG. 1) for navigation and control of the vehicle (not shown). As noted above, the primary INS unit 130 may additionally provide the kinetic state vectors and any error or fault information to the health management system 180 and/or the GUI 170. The errors gathered in the Kalman filter 136 may particularly be provided to the health management system 180 as residuals or second health indicators.

As noted above, the second INS unit 140 may be used to provide a second set of kinematic state vectors that are subsequently used by the health management system 180 for more accurate kinematic state vectors and bias estimations. Particularly, the secondary INS unit 140 may be initialized using a switch 142. The sampling rate of the switch 142 determines the frequency and duration of kinematic state vector estimation by the secondary INS unit 140. Control of the switch 142 may be based on statistics associated with the kinematic state vectors of the first INS unit 130 and initiated by the health management system 180 or at a predetermined sampling rate or interval. When the switch 142 is turned off, the secondary INS unit 140 is typically reset in anticipation of the next iteration.

As shown in FIG. 2, the secondary INS unit 140 includes a secondary input filter 144, a secondary kinematic state vector estimation module 146, and a secondary Kalman filter 148. In general, the secondary INS unit 140 is similar to the primary INS unit 130 except that any errors in the kinematic state vector estimation are allowed to grow without bound, e.g., without correction from the GNSS 122.

Accordingly, upon initialization of the switch 142, the secondary input filter 144 receives the measurements from the IMU 110 and, optionally, the additional aiding sensors 124. Like the input filter 132, the secondary input filter 144 generally functions to reject measurements that are completely outside of a possible range. The accepted measurements are provided to the secondary kinematic state vector estimation module 134, which includes a number of models that initially estimate the secondary kinematic state vectors based on the measurements from the IMU 110. The secondary kinematic state vector estimation module 134 provides the initial second set of kinematic state vectors to the secondary Kalman filter 148, which in turn further filters the kinematic state vectors to produce a second set of kinematic state vectors (e.g., a posterior second set of kinematic state vectors). As noted above, the secondary kinematic state vector estimation module 146 and secondary Kalman filter 148 generate the second set of (or uncorrected) kinematic state vectors without considering the GNSS measurements from the GNSS 122. The secondary INS unit 140 may calculate the second set of kinematic state vectors either with or without using measurements from the additional aiding sensors 124. Typically, the secondary INS unit 140 uses a subset of the measurements from the additional aiding sensors 124. In one exemplary embodiment, the primary INS unit 130 and the secondary INS unit 140 may use the same IMU sensor measurement models.

As in the primary INS unit 130, the Kalman filter 148 may include a bias estimation module and an a-priori basis estimation module. However, in the secondary INS unit, the bias estimation module may include a number of models that estimate the measurement bias of the IMU 110 without, for example, measurements from the GNSS unit 122. As described below, the Kalman filter 148 generates kinematic state vectors and error estimates, including Kalman filter residuals that may be provided to the input filter 144 for generating input residuals. The second set of kinematic state vectors from the secondary INS unit 140 are provided to the health management system 180 for subsequent fault detection.

The health management system 180 generally includes a comparator 182, an IMU sensor parameter unit 184, a residuals filtering unit 186, a health indicator module 188, and an indicator fusion module 190. As described above, the health management system 180 receives health indicators from the input filter 132 of the first INS unit 130 as first health indicators at the indicator fusion module 188. The health management system 180 further receives the innovations or residuals from the Kalman filter 136 of the primary INS unit 130 as second health indicators at the residuals filtering unit 186. The residuals filtering unit 186 may include a jump filtering unit and provides the second health indicators to the health indicator module 188. These health indicators are processed by the health indicator module 188 to estimate the nature of the errors, such as the magnitude and direction of drift, bias, variances, etc. For example, the health indicators module 188 may compare the health indicators to an expected probability density function to determine faults. These estimates are then provided to the indicator fusion block 190. The indicator fusion module 190 is discussed in greater detail below.

As stated above, the health management system 180 further receives the second set of kinematic state vectors from the secondary INS unit 140 as well as the first set of kinematic state vectors from the primary INS unit 130. Particularly, the comparator 182 of the health management system 180 compares the two sets of kinematic state vectors to determine the differences between the kinematic state vectors. The resulting differences are provided to the IMU sensor parameter estimation unit 184, which uses IMU measurement models to estimate the IMU sensor parameters and various types of errors or characteristics of the IMU measurements. In one exemplary embodiment, the estimated IMU sensor parameters are compared to the current set of IMU sensor parameters to identify IMU sensor modeling errors. The resulting estimated parameters are provided to the indicator fusion module 190 as third health indicators. The third health indicators generally correspond to errors attributed to measurement errors in the IMU 110, which may also correspond to drift in the IMU 110.

As such, the indicator fusion module 190 may directly or indirectly receive health indicators from the input filter 132 of the primary INS unit 130, the Kalman filter 136 of the primary INS unit 130, and the secondary INS unit 140. The indicator fusion module 190 may fuse the various indicators to confirm, isolate and quantify faults using logical, voting or probabilistic reasoning to fuse the available indicators. In one exemplary embodiment, the fault may be detected and isolated based on a single fault assumption (presence of single fault in either an accelerometer or gyroscope based on a single type of health indicator) or based on a combination of fault indications. In another exemplary embodiment, the fault is identified, isolated and quantified, and then the associated correction is fed back to the primary INS unit 130. If the fault is an IMU measurement model error, then the fault is fed back to the secondary INS unit 140 to update the IMU measurement models in the secondary kinematic state vector estimation module 146 and/or secondary Kalman filter 148.

As noted above, the indicator fusion module 190 may identify a based on a single type of health indicator, such as the differences between the kinematic state vectors, or a combination of the health indicators. For example, the indicator fusion module 190 may detect a statistical property shift, e.g., a change in mean and/or distribution density function, or stochastically estimate the fault parameters based on any number of techniques. These statistical comparisons may be used to separate the various types of sensor faults discussed above. For example, the delta comparison of the comparator 182 may be a comparison of the mean (or first moment of a distribution) and used to determine a change in the standard deviation of a Gauss Markov process that governs the IMU bias. Higher order statistics of the comparison may be used to estimate additional faults of the IMU sensors. In general, however, any statistical technique may be used to identify the faults.

In one exemplary embodiment, the indicator fusion module 190 may also separate out accelerometer bias from the gyroscope bias. For example, the errors in measurements from the gyroscopes 114 may be considered in the orientation angles. The combination of accelerometer errors and gyroscope errors may be considered in the position and velocity so that if the impact of gyroscope errors is removed from the position and velocity, such that only the accelerometer errors remain. The vehicle trajectory may also assist in identifying if the errors in position and velocity are due to the accelerometer errors or the gyroscope errors.

The indicator fusion module 190 (or other component) may include model that govern how the bias impacts the accelerometer and gyroscope measurements. As noted above, the second set of kinematic state vectors include some bias that are allowed to grow without bound during operation of the secondary INS unit 140. Based on this second set, such models determine how the uncompensated bias affects the position, velocity, and angular orientation values.

For example, in one exemplary embodiment, the gyroscope bias may be determined by comparing the angular orientation computed as part of the first and second sets of kinematic state vectors. The error growth of the difference between the two estimated angular orientations may be directly equated to the parameters of the selected gyroscope measurement model with a statistical approach, such as least squares. Upon estimation the parameters of the gyroscope measurement model (e.g., primarily the bias), the parameters of the accelerometer measurement model using the position and velocity differences between the first and second sets of kinematic state vectors. The gyroscope bias may be removed to identify the remaining acceleration bias. The indicator fusion module 190 may then use these estimated parameters of the acceleration and gyroscope biases to identify IMU sensor faults using any suitable statistical tests. Of course, the examples discussed herein for determining the acceleration and gyroscope bias are merely exemplary and other techniques may be used.

Accordingly, the indicator fusion module 190 may determine at least two different failure modes of the IMU 110. The failure modes may include 1) accelerometer failure resulting in a bias change, and 2) gyroscope bias and drift. These issues are particularly important in an INS 100 with a single set of three-axis accelerometers 114. Even in a highly redundant system, these exemplary embodiments of fault detection and isolation may provide additional health information to the redundancy management system.

In one exemplary embodiment, the accelerometer bias fault determinations use the bias estimate along with the multiple of 1-sigma confidence level generated using the a-priori IMU sensor noise variance. The health management system 180 may produce an alarm when the bias estimate exceeds a user-defined multiple of the 1-σ bias estimate bound. As one example, isolation may be performed by attributing the persistent alarm on the accelerometer bias estimates to the faulty accelerometer.

Figure 3:
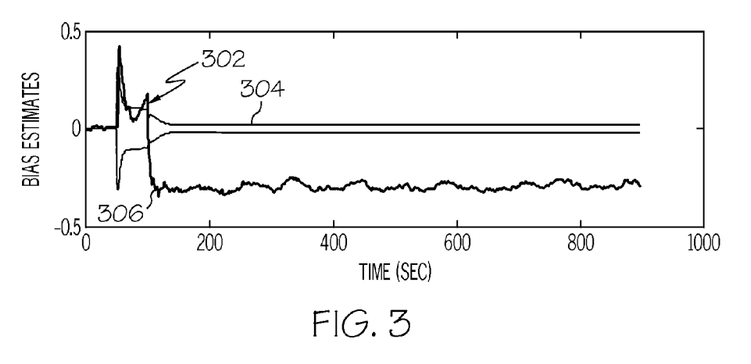
FIG. 3 is test data indicating accelerometer bias over time.
Figure 4:
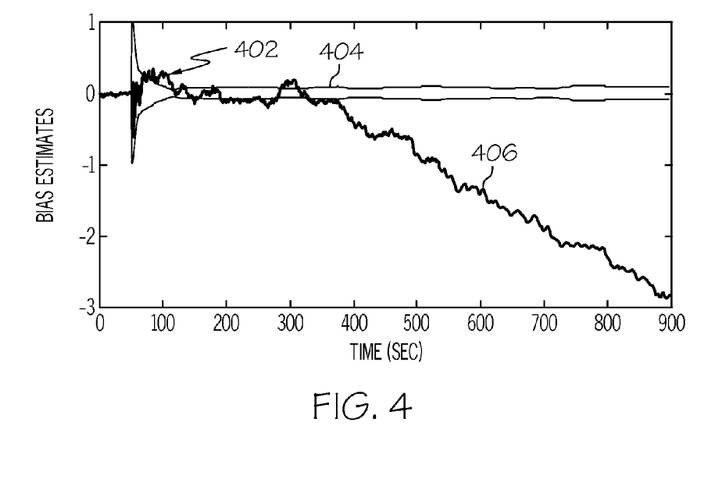
FIG. 4 is test data indicating gyroscope bias over time.

FIGS. 3 and 4 illustrate test data indicating accelerometer bias and gyroscope bias, respectively, over time. As described above, a fault may be identified by comparing estimates to predetermined fault thresholds. FIG. 3 particularly illustrates the accelerometer bias estimates 302, the 1-σ estimation errors (or bounded limits) 304 of the accelerometer bias estimates 302, and the alarm trigger 306 indicating accelerometer bias change. By allowing the effect of the accelerometer bias estimates 302 on the kinematic state vector to accumulate over time with the secondary INS unit 140, the health management system 180 may more easily identify the accelerometer bias at the alarm trigger 306.

FIG. 4 particularly illustrates the gyroscope bias estimates 402, the 1-σ estimation errors (or bounded limits) 404 of the gyroscope bias estimates 402, and the alarm trigger 406 indicating gyroscope bias change. By allowing the effect of the gyroscope bias estimates 402 on the kinematic state vector to accumulate over time with the secondary INS unit 140, the health management system 180 may more easily identify the gyroscope bias at the alarm trigger 406.

Accordingly, exemplary embodiments discussed herein include update, correct, or modify errors associated with IMU measurements. Exemplary embodiments may identify the following: an accelerometer fault, gyroscope fault, an accelerometer measurement fault, a gyroscope measurement fault; the axis of the accelerometer measurement fault; the axis of the rate gyro measurement fault; a fault in the IMU sensor measurement model, an accelerometer parameter fault; a gyroscope parameter fault; the axis of the accelerometer parameter fault; and the axis of the gyroscope parameter fault.

It should be observed that the disclosed embodiments reside primarily in combinations of device components and process sets. Various aspects of the embodiments, such as units and other function blocks, modules, circuits, and algorithm steps described herein may be implemented as electronic hardware, computer software, or combinations of both. The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An inertial navigation system (INS), comprising:
a primary inertial navigation system (INS) unit configured to receive first accelerometer measurements from a first accelerometer and first angular velocity measurements from a first gyroscope,
the primary INS unit further configured to receive global navigation satellite system (GNSS) signals from a GNSS sensor and to determine a first set of kinematic state vectors based on the first accelerometer measurements, the first angular velocity measurements, and the GNSS signals;
a secondary INS unit configured to receive the first accelerometer measurements and the first angular velocity measurements and to determine a second set of kinematic state vectors of the vehicle based on the first accelerometer measurements and the first angular velocity measurements; and
a health management system configured to compare the first set of kinematic state vectors and the second set of kinematic state vectors to determine faults associated with at least one of the first accelerometer or the first gyroscope based on the comparison.

2. The INS of claim 1, wherein the primary INS unit includes primary accelerometer and gyroscope measurement models for determining the first set of kinematic state vectors and the secondary INS unit includes secondary accelerometer and gyroscope measurement models for determining the second set of kinematic state vectors.

3. The INS of claim 2, wherein the primary accelerometer and gyroscope measurement models and the secondary accelerometer and gyroscope measurement models are the same.

4. The INS of claim 2, wherein the health management system is further configured to determine faults associated with the primary accelerometer and gyroscope measurement models or the secondary accelerometer and gyroscope measurement models.

5. The INS of claim 1, wherein the health management system is configured to generate the second set of kinematic state vectors with errors due to accelerometer bias.

6. The INS of claim 1, wherein the health management system is configured to generate the second set of kinematic state vectors with errors due to gyroscope bias.

7. The INS of claim 1, further comprising a switch coupled to the secondary INS unit and configured to initialize the secondary INS unit based on a predetermined sampling rate or statistics associated with the first set of kinematic state vectors.

8. The INS of claim 1, wherein the primary INS unit is further configured to receive additional sensor measurements from at least one additional aiding sensor and to additionally determine the first set of kinematic state vectors based on the additional sensor measurements.

9. The INS of claim 1, wherein the secondary INS unit is configured to determine the second set of kinematic state vectors independently of the GNSS signals.

10. The INS of claim 1, wherein the comparison between the first set of kinematic state vectors and the second set of kinematic state vectors generates a first set of health indicators, and wherein the primary INS unit includes a first Kalman filter configured to receive the GNSS signals and to determine a second set of health indicators associated with the first set of kinematic state vectors.

11. The INS of claim 10, wherein primary INS unit includes an input filter configured to produce a third set of health indicators associated with the first set of kinematic state vectors, and wherein the health management system includes a fusion module configured to determine the faults based on the first set of health indicators, the second set of health indicators, and the third set of health indicators.

12. A vehicle system, comprising:
an inertial measurement unit (IMU) comprising a first accelerometer configured to generate first acceleration measurements and a first gyroscope configured to generate first angular velocity measurements;
a global navigation satellite system (GNSS) configured to generate GNSS signals;
a primary inertial navigation system (INS) unit configured to receive the first accelerometer measurements, the first angular velocity measurements, and the GNSS signals, the primary INS unit further configured to determine a first set of kinematic state vectors based on the first accelerometer measurements, the first angular velocity measurements, and the GNSS signals;
a secondary INS unit configured to receive the first accelerometer measurements and the first angular velocity measurements and to determine a second set of kinematic state vectors of the vehicle based on the first accelerometer measurements and the first angular velocity measurements, wherein the secondary INS unit is configured to determine the second set of kinematic state vectors independently of the GNSS signals; and
a health management system coupled to the primary INS unit and the secondary INS unit and configured to compare the first set of kinematic state vectors and the second set of kinematic state vectors to determine faults associated with at least one of the first accelerometer or the first gyroscope based on the comparison,
wherein the primary INS unit includes primary accelerometer and gyroscope measurement models for determining the first set of kinematic state vectors and the secondary INS unit includes secondary accelerometer and gyroscope measurement models for determining the second set of kinematic state vectors,
wherein the primary accelerometer and gyroscope measurement models and the secondary accelerometer and gyroscope measurement models are the same, and
wherein the health management system is further configured to determine faults associated with the primary accelerometer and gyroscope measurement models or the secondary accelerometer and gyroscope measurement models.

13. The vehicle system of claim 12, wherein the health management system is configured to generate the second set of kinematic state vectors with errors due to accelerometer bias.

14. The vehicle system of claim 12, wherein the health management system is configured to generate the second set of kinematic state vectors with errors due to gyroscope bias.

15. The vehicle system of claim 12, further comprising a switch coupled to the secondary INS unit and configured to initialize the secondary INS unit based on a predetermined sampling rate or statistics associated with the first set of kinematic state vectors.

16. A vehicle system, comprising:
a first inertial measurement unit (IMU) comprising a first accelerometer configured to generate first acceleration measurements and a first gyroscope configured to generate first angular velocity measurements;
a global navigation satellite system (GNSS) configured to generate GNSS signals;
a primary inertial navigation system (INS) unit configured to receive the first accelerometer measurements, the first angular velocity measurements, and the GNSS signals, the primary INS unit further configured to determine a first set of kinematic state vectors based on the first accelerometer measurements, the first angular velocity measurements, and the GNSS measurements, the primary INS unit including a first Kalman filter configured to receive the GNSS signals and to determine a first set of health indicators associated with the first set of kinematic state vectors and an input filter configured to produce a second set of health indicators associated with the first set of kinematic state vectors;
a secondary INS unit configured to receive the first accelerometer measurements and the first angular velocity measurements and to determine a second set of kinematic state vectors of the vehicle based on the first accelerometer measurements and the first angular velocity measurements and independently of the GNSS signals; and
a health management system coupled to the primary INS unit and the secondary INS unit and configured to compare the first set of kinematic state vectors and the second set of kinematic state vectors to generate a third set of health indicators, the health management system further configured to determine faults associated with at least one of the first accelerometer or the first gyroscope based on at least one of the first set of health indicators, the second set of health indicators, or the third set of health indicators.

17. The INS of claim 1, wherein the health management system is configured to compare first angular orientations from the first set of kinematic state vectors and second angular orientations from the second set of kinematic state vectors to generate angular orientation differences, and wherein the health management system determines an error growth of the angular orientation differences and generates parameters for a gyroscope measurement model based on the error growth, and wherein the gyroscope measurement model forms a portion of the health management model configured to determine the fault associated with the first gyroscope.

18. The INS of claim 17, wherein the fault associated with the first gyroscope based is gyroscope bias.

19. The INS of claim 18, wherein the health management system is configured to compare first positions and first velocities from the first set of kinematic state vectors and second positions and second velocities from the second set of kinematic state vectors to generate position and velocity differences, wherein the health management system generates parameters for an acceleration measurement model based on the position and velocity differences, and wherein the acceleration measurement model forms a further portion of the health management model configured to determine the fault associated with the first accelerometer.

20. The INS of claim 19, wherein the health management system is further configured to remove the gyroscope bias from the acceleration measurement module to determine the fault associated with the first accelerometer, wherein the fault associated with the first accelerometer is acceleration bias, wherein the primary INS unit includes primary models for determining the first set of kinematic state vectors and the secondary INS unit includes secondary models for determining the second set of kinematic state vectors, and wherein the health management system is configured to update the primary and secondary models to remove the gyroscope bias and the acceleration bias.

* * * * *